J. C. HENDERSON.
COMBINED MOTOR AND AIR PUMP.
APPLICATION FILED DEC. 8, 1911.

1,053,991.

Patented Feb. 25, 1913.

5 SHEETS—SHEET 1.

Witnesses
J. M. Fowler Jr.
R. S. Trogner

Inventor
John C. Henderson
By Carey S. Fyffe
Attorney

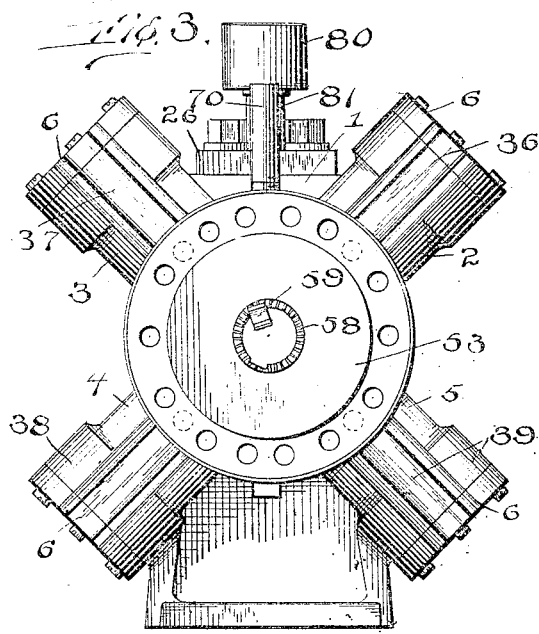
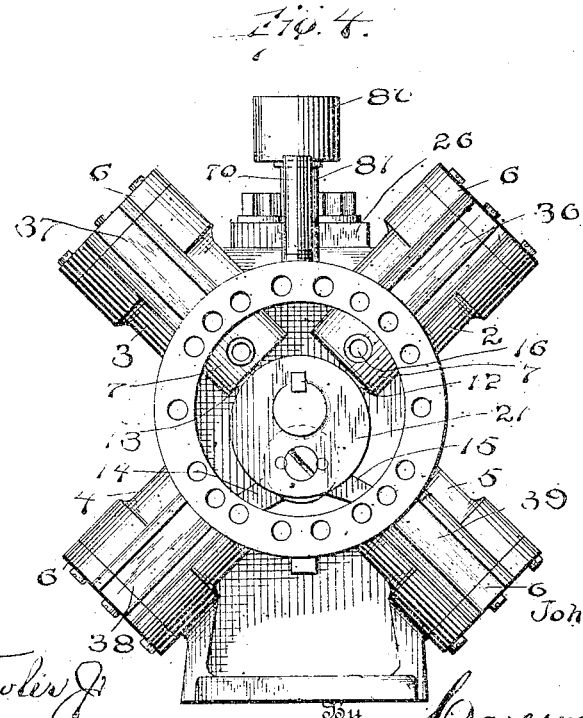

J. C. HENDERSON.
COMBINED MOTOR AND AIR PUMP.
APPLICATION FILED DEC. 8, 1911.
1,053,991.
Patented Feb. 25, 1913.
5 SHEETS—SHEET 3.
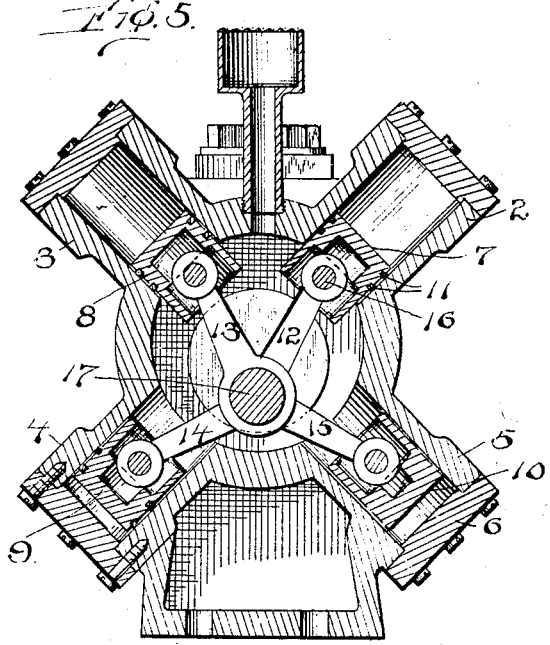
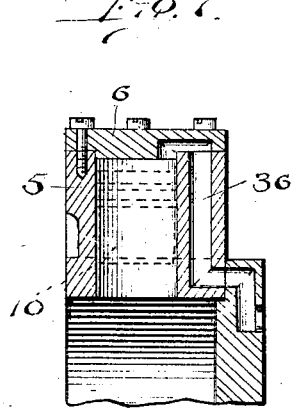
Inventor
John C. Henderson.
Witnesses
By
Attorney J. C. HENDERSON.
COMBINED MOTOR AND AIR PUMP.
APPLICATION FILED DEC. 8, 1911.
1,053,991.
Patented Feb. 25, 1913.
5 SHEETS—SHEET 4.
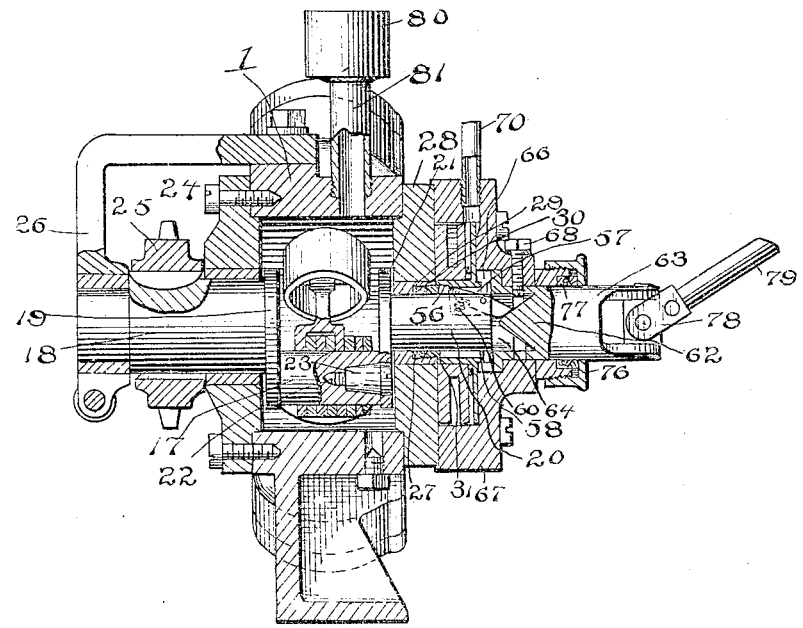
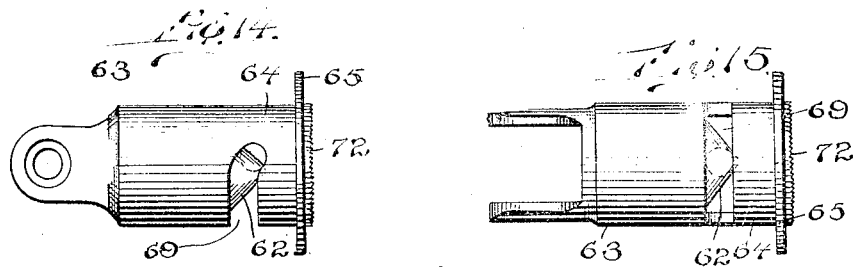
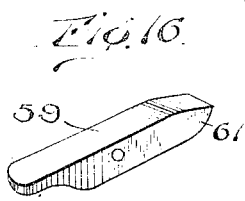
Inventor
John C. Henderson.
Witnesses
G. N. Fowler
R. S. Trogner.
By Carey S. Frye
Attorney

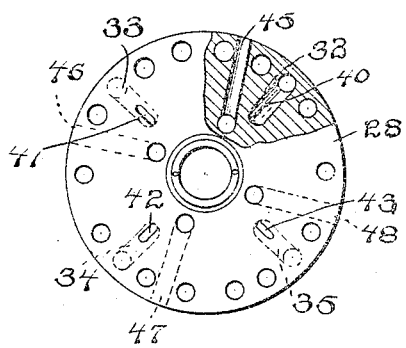
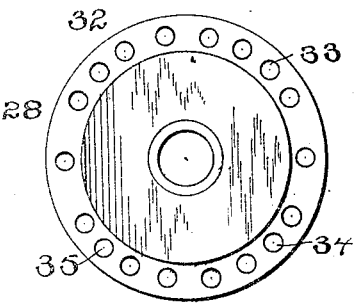
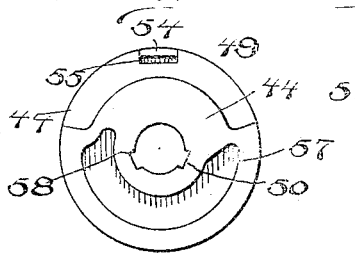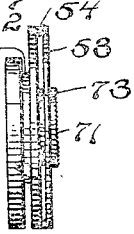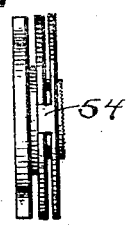
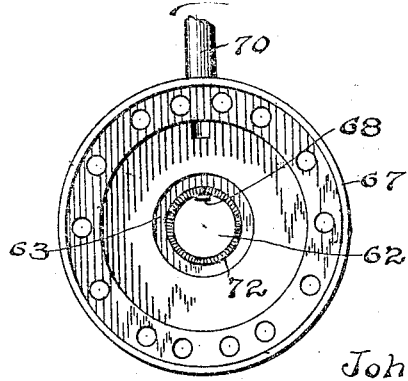

UNITED STATES PATENT OFFICE.

JOHN CHARLES HENDERSON, OF SAN FRANCISCO, CALIFORNIA.

COMBINED MOTOR AND AIR-PUMP.

1,053,991. Specification of Letters Patent. Patented Feb. 25, 1913.

Application filed December 2, 1911. Serial No. 664,588.

*To all whom it may concern:*

Be it known that I, JOHN C. HENDERSON, a citizen of the United States, residing at San Francisco, in the county of San Francisco and State of California, have invented certain new and useful Improvements in a Combined Motor and Air-Pump; and I do hereby declare the following to be a full, clear, and exact description of the invention, such as will enable others skilled in the art to which it appertains to make and use the same.

My invention relates to new and useful improvements in a combined motor and air pump and my object is to provide a device of this class which may be operated by compressed air or any other suitable propelling medium to cause the same to act as an engine for driving machinery or other objects or used in connection with an additional source of power for pumping air or other medium and storing the same into a suitable tank for use as a propelling medium for the motor.

A further object is to provide a plurality of cylinders and pistons and connect the pistons to a single crank by which they are operated.

A further object is to provide a single valve which is adapted to control the ports of the motor, said valve operating with the shaft of the motor so that when the propelling medium is being fed to certain of the cylinders of the engine the other cylinders will be arranged to exhaust.

A further object is to provide means for changing the relative position of the valve upon its supporting shaft whereby the motor will be converted into an air pump, the locking means for the valve being operated from parts of the rotating mechanism, and, a further object is to provide an expansion chamber for the oil contained in the crank case.

Other objects and advantages will be hereinafter set forth and pointed out in the following specification.

Figure 1:
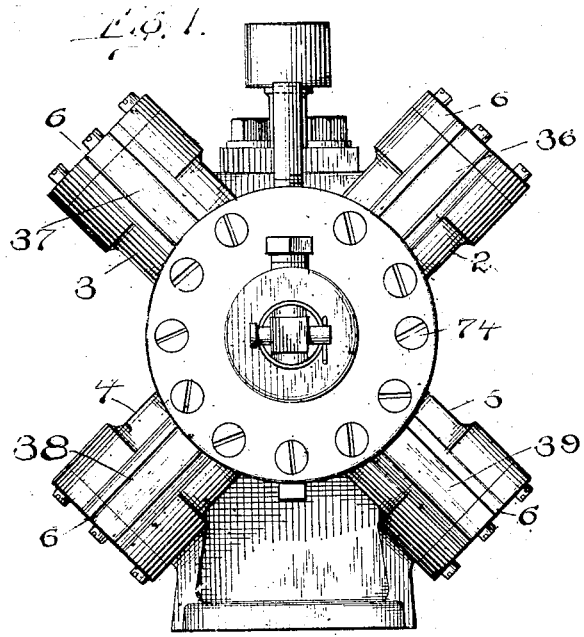
Figure 2:
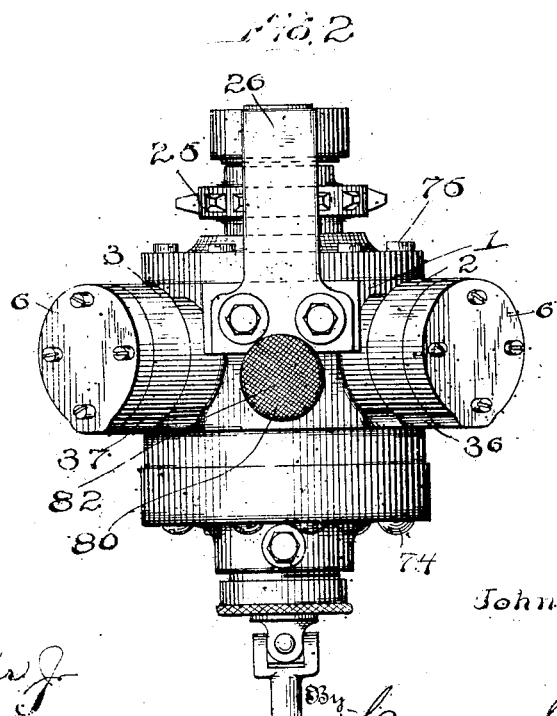

In the accompanying drawings which are made a part of this application, Figure 1 is an end elevation of the motor. Fig. 2 is a top plan view thereof. Fig. 3 is an end elevation showing the valve casing and parts carried thereby removed. Fig. 4 is a similar view showing the valve and the valve seat removed. Fig. 5 is a vertical transverse sectional view through the motor. Fig. 6 is a vertical longitudinal central sectional view of the motor. Fig. 7 is a vertical sectional view through one of the cylinders of the motor with the piston removed. Fig. 8 is a plan view of the valve seat. Fig. 9 is a similar view of the opposite face of the valve seat. Fig. 10 is an elevation of the inner face of the valve. Fig. 11 is an edge elevation thereof. Fig. 12 is a similar view showing the valve at a quarter turn from the position shown in Fig. 11. Fig. 13 is an elevation of the inner face of the valve casing. Fig. 14 is an elevation of the valve controlling sleeve. Fig. 15 is a similar view showing the sleeve at a half turn from that shown in Fig. 14, and, Fig. 16 is a perspective view of the locking bar employed for holding the valve against independent rotation.

Referring to the drawings in which similar reference numerals designate corresponding parts throughout the several views, 1 indicates the body or crank case of the motor, radiating from the peripheral surface of which are cylinders 2, 3, 4 and 5, the outer ends of the cylinders having caps 6 removably attached thereto whereby access may be had to the outer ends of the cylinders. Slidably mounted within the cylinders are pistons 7, 8, 9 and 10 which are provided around their peripheries with any suitable number of snap rings 11 to prevent leakage between the pistons and the cylinders.

The pistons are provided with connecting rods 12, 13, 14 and 15, respectively, the outer ends of which are connected to the pistons through the medium of wrist pins 16, while the inner ends thereof are connected to a crank 17, the inner ends of the connecting rods being preferably bifurcated and interlapped with each other as best shown in Fig. 6 of the drawings, whereby all of the pistons may be operated from a single throw crank and the connecting rods positioned to intersect the pistons at their axial centers.

The crank 17 is carried by a driving shaft 18, the crank being formed integral with one section of the driving shaft through the medium of a disk 19, while the opposite section 20 of the driving shaft is also provided with a disk 21 which is connected to the end of the crank 17 by means of a bolt 22 and a tapered sleeve 23 and when so connected the two ends of the shaft work in unison. By connecting the pistons to the shaft in the manner shown it will be seen that said pistons will work in pairs, that is to say, when two of the pistons are on their inward stroke the opposite two pistons will be on their outward stroke, this feature being clearly shown in Fig. 5 of the drawings.

One end of the driving shaft projects through a head 24 and has attached thereto preferably a sprocket 25, the extreme outer end of this portion of the driving shaft being preferably entered in a bearing in a supporting arm 26, which arm securely braces the driving shaft and prevents undue strain thereon. The end section 20 of the driving shaft is introduced through a sleeve 27 which sleeve is extended through a valve seat 28, said valve seat covering the opposite end of the crank case 1 from that occupied by the head 24.

The sleeve 27 has a seat 29 therein in which is introduced suitable packing 30, said packing being held in position by means of a ring 31 which is exteriorly threaded and engages threads on the inner surface of the seat 29, said packing serving to prevent leakage of air between the sleeve and the section of the driving shaft.

The valve seat 28 is provided with ports 32, 33, 34 and 35 which communicate at one end with ducts 36, 37, 38 and 39, respectively, which ducts in turn communicate with the outer ends of the cylinders 2, 3, 4 and 5, respectively, and by means of which the propelling medium is inducted into or expelled from the cylinders. The inner ends of the ports 32, 33, 34 and 35 communicate with the opposite face of the valve seat 28 through slots 40, 41, 42 and 43, respectively, and these slots are controlled through the medium of a valve 44 which valve is rotatably mounted upon the section 20 of the driving shaft. The valve seat 28 is also provided with ports 45, 46, 47 and 48 which coöperate with the ports 32, 33, 34 and 35, respectively, and act as intake or exhaust ports for the cylinders, the outer ends of said latter ports communicating with the outer atmosphere, while the inner ends thereof communicate with the inner ends of said latter ports terminating nearer the axis of the valve seat than do said slots.

The valve 44 is in the form of a disk and a portion of its peripheral edge is cut away to form a channel 49, the depth of said channel being sufficient to expose such of the slots in the valve seat as are in registration with the channel. The face of the valve engaging the valve seat is provided with a groove 50, which groove is curved in conformity with the curvature of the periphery of the valve and is of sufficient width to expose both the slots and inner ends of such of the ports 45, 46, 47 and 48 as may be in registration with the groove and is of sufficient length to coöperate with two of the slots and ports simultaneously.

The valve proper is provided with a hub 51 and to said hub is attached a circular disk 52, coöperating with which is a circular plate 53, having a tongue 54 which engages a notch 55 in the peripheral edge of the disk 52 to cause the valve to rotate with the plate. The circular plate 53 is provided with an inwardly projecting sleeve 56 which extends through and forms a bearing for the hub of the valve and in order to cause the plate and valve carried thereby to rotate in unison with the driving shaft the interior of the sleeve is provided with a pair of notches 57 and 58 with which coöperates a locking bar 59.

The locking bar is pivotally mounted in a channel formed in the outer end of the section 20 of the driving shaft and has a spring 60 positioned under one of its ends and in said channel so that said end will be normally thrown outward and into engagement with one or the other of said notches. The opposite end of the locking bar projects beyond the end of the driving shaft and is provided with a bevel 61 with which engages a cone 62 carried by a valve controlling sleeve 63, said cone when moved inwardly engaging the beveled end of the locking bar and swinging the same on its pivot until the opposite end of the locking bar is moved out of engagement with the latch, thus leaving the plate and valve free to rotate upon the driving shaft. The cone 62 is surrounded by a shell 64, the inner end of the shell having a flange 65 extending at right angles to the trend of the shell which fits a seat 66 in the valve casing 67 so that a substantially non-leakable seal is formed at this point.

The valve controlling sleeve is caused to move inwardly or outwardly when rotated by extending a pin or bolt 68 downwardly through the hub of the valve casing, the inner end of the pin entering a groove 69 formed in the wall of the shell, each end of the groove being curved forwardly of the path of the remainder of the groove so that when the pin is positioned in said curved portions the valve controlling sleeve will be moved outwardly, while said sleeve will be moved inwardly when the pin is positioned in the straight portion of the groove.

By this construction it will be readily seen that when the valve controlling sleeve is moved inwardly the cone will be forced against the tapered end of the locking bar and said bar swung on its pivot to disengage the opposite end of the locking bar from the notches in the sleeve of the circular plate. When the valve is in position on the valve seat and the device is being used as a motor to acquire power for driving an object the locking bar 59 is engaged with the notch 57 and when so engaged the channel 49 will be in registration with the slots 40 and 43 while the groove 50 will be in communication with the slots 41 and 42 and the inner ends of the ports 46 and 47, thereby permitting the cylinders coöperating with said latter slots and ports to exhaust, while the cylinder communicating with the slot 40 will have completed its stroke and the cylinder communicating with the port 43 will be receiving a fresh charge of propelling medium as best shown in Fig. 5 of the drawings. The propelling medium is admitted to the cylinder immediately after the crank has passed beyond the center of gravity or, in other words, the cylinder 5 will be receiving its charge of propelling medium as will also the cylinder 4 as soon as the valve has rotated sufficiently to uncover the slot 42, thus employing the force of both of the pistons 9 and 10 to rotate the crank shaft until such time as the force of the propelling medium in the cylinder 3 will cause the piston 8 to act on the crank shaft.

By arranging the cylinders and valve for admitting the propelling medium thereto in the manner shown, the propelling medium will never be admitted to the cylinders until after the crank shaft has swung past the center and two of the pistons will always be in position to exert driving power against the crank. When the propelling medium is entering the cylinders it enters the valve casing 67 through a pipe 70 which pipe extends to any suitable form of storage tank (not shown) said propelling medium after entering the valve casing passing thence through one of the slots and into the port communicating therewith from whence it passes into the port leading to the outer end of the cylinder. When the cylinders are exhausted, as would be the case with cylinders communicating with the ports 33 and 34 as indicated in Fig. 8, the exhaust product passes from the cylinders through the ports communicating with the outer ends thereof, thence through the ports 33 and 34 through slots 41 and 42 and into the groove 50 in the valve, thence through the ports 46 and 47, also communicating at their inner ends with the groove 50, the exhaust passing to the outer atmosphere from said latter ports. As also shown in Fig. 8, the valve as positioned closes the inner ends of the ports 45 and 48 so that communication with the outer atmosphere is excluded at these two points.

This motor is primarily adapted for starting internal combustion engines, but may as readily be used for any other purpose and when used for starting purposes a connection is effected between the sprocket 25 and the crank shaft of the internal combustion engine (not shown) in any suitable manner so that when the compressed air is entered through the pipe 70, the pistons in the motor will be operated and the power derived thereby employed for rotating the crank shaft of the internal combustion engine.

It is another object of my device to employ the same cylinders for resupplying the compressed air or propelling medium and to accomplish this result it is but necessary to rotate the valve upon its seat a predetermined distance or substantially a half revolution independent of the crank shaft upon which it is attached, thus reversing the action of the pistons, that is to say, the various ports which have been acting as exhaust ports will become intake ports, while the intake ports will become exhaust ports, thus causing the pistons on their inward stroke to draw the air into the cylinders through the ports 45, 46, 47 and 48 through the slots 40, 41, 42 and 43 and into the cylinders through the ports communicating with said slots, while on the outward stroke of the pistons the valve will be so positioned that the air taken into the cylinders will be forced through the slots in the valve seat and through the pipe 70 into a storage tank.

The valve is rotated on the driving shaft by providing the outer face of the plate 53 with substantially V-shaped teeth 71 which are engaged by a similar set of teeth 72 on the inner end of the valve controlling sleeve. As the valve controlling sleeve is moved inwardly to disengage the locking bar from the notch in the plate, the two sets of teeth are brought together simultaneously with the release of the locking bar from the notch or as soon as the pin 68 has been moved into the straight portion of the groove 69 so that by continuing the rotation of the valve controlling sleeve the valve will be rotated independently of the driving shaft until the notch 58 is brought into registration with the end of the locking bar. As soon as the pin 68 moves into the curved portion of the groove at the opposite end thereof, the valve controlling sleeve will be moved outwardly, thereby disengaging the teeth 72 from the teeth 71 and at the same time releasing the cone from engagement with the locking bar, whereupon the spring 60 will immediately move the inner end of the locking bar into engagement with the notch 58, thus securely holding the valve against independent movement of the driving shaft. The valve is held with uniform pressure against the valve seat, thereby obtaining a perfect fit of the valve with the seat, by placing a plurality of coil springs 73 between the disk 52 and the plate 53 so that when the valve controlling sleeve is moved into engagement with the plate the pressure thereof will not materially affect the pressure of the valve against the valve seat, as the springs will sufficiently yield to compensate for such pressure. The valve seat and valve casing are held in position at the end of the crank case by introducing bolts 74 through the valve casing and valve seat into the edge of the crank case and the head 24 is likewise secured to the crank case through the medium of bolts 75. The end of the valve controlling sleeve projecting beyond the valve casing is surrounded by a removable cap 76 between which and the end of the valve casing is introduced any suitable form of packing 77 to assure against leakage at this point. The extreme outer end of the valve controlling sleeve is bifurcated to receive a universal joint 78 to which is attached a rod 79 for controlling the rotating movement of the valve sleeve and this rod can be extended to any suitable point for ready manipulation.

As the crank case is to be filled with lubricating oil and in view of the fact that the rapid rotation of the crank within the case causes the oil to expand, I provide an expansion chamber or cup 80 which is connected to the interior of the crank case by means of a pipe 81 so that when the oil within the crank case expands it will pass through the pipe into the expansion chamber. As the oil is consumed in the crank case an additional supply is fed into the crank case from the expansion chamber and as the pipe is smaller than the expansion chamber the oil will be gradually fed into the crank case from the expansion chamber. As the upper end of the expansion chamber is left open in order to prevent a vacuum within the crank case, a strip of fine wire gauze 82 or similar substance is placed over the upper end of the expansion chamber to exclude dirt and the like from the oil. As the expansion chamber is located above the crank case, it can be used for introducing the oil into the crank case when a new supply is necessary. By arranging the cylinders in the manner shown and providing a single valve for changing the device from a driving motor to a pump it can be constructed in compact form and at a minimum expense. It will likewise be seen that the device can be used for starting internal combustion engines, or by arranging any suitable means for operating the pistons when used as a pump to resupply the tank, the motor can be used for driving machinery or similar objects and it will likewise be seen that the valve can be instantly changed from one position to the other to provide a driving motor or a pump, as occasion may require and at the same time not affecting the rotation of the crank shaft or the movement of the pistons.

What I claim is:—

1. In a combined motor and pump the combination with a plurality of cylinders having pistons therein and ports communicating with said cylinders, of a disk-like valve having a groove in one face thereof adapted to coöperate with certain of said ports and a channel at its edge to coöperate with other of said ports, a plate having a sleeve upon which said valve is mounted, means to cause said valve to rotate with the plate and yielding means between the plate and valve to hold said valve in proper relation adjacent the ports.

2. In a motor the combination with a plurality of cylinders and pistons in said cylinders, of a valve seat having ports therein, a disk-like valve coöperating with said seat, a plate having a sleeve upon which said valve is mounted and yielding means between the plate and valve to hold said valve in proper relation adjacent the ports.

3. In a motor the combination with a plurality of cylinders having ports communicating therewith, of a rotating valve coöperating with said ports, a plate having a sleeve thereon, upon which said valve is mounted, means to cause the valve to rotate with the plate, springs between the plate and valve to yieldingly hold the valve adjacent the ports and means to manually rotate said valve.

4. In a combined motor and pump the combination with a crank case, a crank shaft projecting through said case, a plurality of cylinders arranged around said case, pistons in said cylinders and connected to the crank portion of the shaft and a valve seat having ports therein arranged in pairs, one of the pairs of ports communicating with one of the cylinders at its outer end and the other port communicating with the outer edge of the seat, of a valve rotatable with said shaft having a channel in one edge adapted to coöperate with certain of said ports and a groove in one face of the valve to coöperate with others of said ports, means to yieldingly hold the valve adjacent the seat, a locking bar adapted to normally hold the valve against independent rotation of the crank shaft, means to automatically release the locking bar from the valve and simultaneously engage the valve and rotate the same independently of the shaft.

5. In a motor the combination with a plurality of cylinders, pistons coöperating therewith and a crank shaft connected to the pistons, of a valve seat having ports arranged in pairs, one end of said ports communicating with one face of the valve seat, the opposite ends of one of each set of ports communicating with the cylinders and the same end of the remaining ports with the outer edge of the valve seat, a valve carried by the crank shaft having a channel in one edge adapted to register with the inner ends of certain of the ports communicating with the cylinders and having a recess in one face adapted to register with the inner ends of certain of the pairs of ports whereby propelling medium will be introduced into the ports registering with the recess and the ports communicating with the groove permitted to exhaust.

6. In a motor the combination with a plurality of cylinders, a valve seat having ports therein arranged in pairs, one of each pair of ports communicating with the cylinders, a valve coöperating with said ports to control the same, said valve having notches therein and teeth on its outer face, of a spring operated locking bar having one of its ends arranged to engage the notches to hold the valve against independent rotation, a valve controlling sleeve having a cone adapted to engage and release the locking bar from said notches, means to cause said sleeve to move lengthwise when rotated and teeth on the inner end of the sleeve adapted to engage the teeth of the valve and rotate said valve when the locking bar is released from the notches.

7. In a motor the combination with a plurality of cylinders and a crank shaft, of a valve mounted upon said shaft, the wall of the opening through which the shaft extends having notches therein, a locking bar adapted to alternately engage said notches to hold the valve in fixed relation with the crank shaft and means to automatically release the locking bar and rotate the valve.

8. In a motor the combination with cylinders, a crank shaft and a valve mounted upon said shaft, the wall of the opening in said valve through which the shaft extends having notches therein, of a spring operated locking bar adapted to alternately engage said notches to hold the valve in fixed relation with the crank shaft.

9. The combination with a motor comprising a plurality of cylinders having ports, of a valve coöperating with said ports, a plate having a sleeve upon which said valve is mounted and springs carried by the plate and between the plate and valve adapted to direct pressure against the valve and hold the same in close relation with said ports.

10. In a motor the combination with a plurality of cylinders, pistons in said cylinders and a valve coöperating with the cylinders, said valve having teeth thereon, of a tubular sleeve having teeth adapted to engage the teeth on the valve, means to rotate said sleeve and additional means to move the sleeve lengthwise to engage the teeth with or disengage them from the teeth of the valve.

11. In a motor the combination with a plurality of cylinders and a valve coöperating with the cylinders, of a tubular sleeve, means to move the sleeve toward or from the valve, means to cause the valve to rotate with the sleeve, a latch adapted to hold the valve in adjusted position and means on the sleeve to engage and release the latch when the sleeve is moved inwardly.

12. In a motor the combination with cylinders and a rotating valve coöperating therewith, of a tubular sleeve adapted to engage and rotate the valve, said sleeve having a slot extending circumferentially thereof, the ends of which slot are curved forwardly and a pin engaging said slot to cause the sleeve to move lengthwise when the sleeve is rotated.

13. In a motor the combination with cylinders and a valve coöperating therewith, of a tubular sleeve having a circumferential slot therein, the ends of which slot are curved inwardly, a pin engaging said slot to cause said sleeve to move into and out of engagement with the valve when the sleeve is rotated, said valve and inner end of the sleeve having interlocking means thereon, whereby the valve will be positively rotated when the sleeve is rotated.

In testimony whereof I have signed my name to this specification in the presence of two subscribing witnesses.

JOHN CHARLES HENDERSON.

Witnesses:
MARION A. WILSON,
JEROME L. TALLANT.